United States Patent
Bruyas et al.

(10) Patent No.: US 6,270,245 B1
(45) Date of Patent: Aug. 7, 2001

(54) EXTRUSION MACHINE BARREL HAVING A THREE-LOBE BORE, AND LINER THEREFOR

(75) Inventors: Laurent Bruyas, Pont Salomon; Daniel Chenevier, St Just St Rambert; Serge Maisonny, Aures-sur-Loire, all of (FR)

(73) Assignee: Clextral, Courbevoie (FR)

( * ) Notice: Subject to any disclaimer, the term of this patent is extended or adjusted under 35 U.S.C. 154(b) by 0 days.

(21) Appl. No.: 09/308,327

(22) PCT Filed: Oct. 2, 1997

(86) PCT No.: PCT/FR97/01742

§ 371 Date: Jul. 15, 1999

§ 102(e) Date: Jul. 15, 1999

(87) PCT Pub. No.: WO98/22274

PCT Pub. Date: May 28, 1998

(30) Foreign Application Priority Data

Nov. 21, 1996 (FR) .................................................. 96 14240

(51) Int. Cl.$^7$ ........................................................ B29B 7/80
(52) U.S. Cl. .................................................................. 366/84
(58) Field of Search ........................... 366/69, 79, 83–85, 366/300, 301, 80; 425/204, 208, 209

(56) References Cited

U.S. PATENT DOCUMENTS

| | | | |
|---|---|---|---|
| 2,508,495 | * | 5/1950 | Consalvo . |
| 2,550,226 | * | 4/1951 | Colombo . |
| 3,268,949 | * | 8/1966 | Schmidt et al. . |
| 3,590,429 | * | 7/1971 | Bammert et al. . |
| 3,696,736 | * | 10/1972 | Studli ................................... 425/204 |
| 3,704,866 | * | 12/1972 | Mosher et al. . |
| 3,900,188 | * | 8/1975 | Seufert ................................. 425/208 |
| 3,910,316 | * | 10/1975 | Reifenhauser . |
| 3,927,869 | * | 12/1975 | Hanslik . |
| 3,970,113 | * | 7/1976 | Guttinger et al. .................... 425/204 |
| 4,028,027 | * | 6/1977 | Worz ...................................... 425/204 |
| 4,036,540 | * | 7/1977 | Seufert . |
| 4,117,583 | * | 10/1978 | Gnadig et al. .......................... 366/83 |
| 4,364,664 | * | 12/1982 | Theysohn ............................... 366/84 |
| 4,385,876 | * | 5/1983 | Scherping et al. ..................... 366/85 |
| 4,590,033 | * | 5/1986 | Chapet . |
| 5,093,209 | * | 3/1992 | Kroisenbrunner ................... 425/204 |
| 5,116,135 | * | 5/1992 | Kaiser et al. ........................... 366/84 |
| 5,209,937 | * | 5/1993 | Kangas ................................... 366/84 |
| 5,352,539 | * | 10/1994 | Psiuk ..................................... 425/208 |
| 5,752,770 | * | 5/1998 | Kawaguchi et al. ................... 366/85 |
| 5,816,699 | * | 10/1998 | Keith et al. ............................. 366/84 |

FOREIGN PATENT DOCUMENTS

| | | | |
|---|---|---|---|
| 319 489 A | | 3/1920 | (DE) . |
| 513431 | * | 11/1992 | (EP) ..................................... 366/80 |
| 0 642 861 A | | 3/1995 | (EP) . |
| 889 063 A | | 12/1943 | (FR) . |

OTHER PUBLICATIONS

Schaefer, R.T., et al., "Slot Drilling: Eliminating the Trade–Offs," Printed Circuit Fabrication, vol. 15, No. 10, Oct. 1992, San Francisco, U.S., pp. 40–41, X0000311270.

IBM Technical Disclosure Bulletin, vol., 37, No. 06b, Jun. 1984, New York, US, p. 661, XP002035366 "Dynamic Control Method and Apparatus for Drill Machines".

Patent Abstracts of Japan, vol. 9, No. 303 (M–434) [2026], Nov. 30, 1985, and JP 60 141411 A (Hitachi Kasei), Jul. 26, 1985.

* cited by examiner

*Primary Examiner*—Charles E. Cooley
(74) *Attorney, Agent, or Firm*—Connolly Bove Lodge & Hutz LLP

(57) ABSTRACT

An extrusion machine having a barrel containing a bore formed of three lobes, designed to receive a liner whose outer face is also formed of three lobes and which has two secant bores which have parallel axes and are adapted to receive two screws.

7 Claims, 3 Drawing Sheets

EXTRUSION MACHINE BARREL HAVING A THREE-LOBE BORE, AND LINER THEREFOR

FIELD OF THE INVENTION

The present invention relates to an extrusion machine barrel, as well as a liner for such an extrusion machine barrel.

The invention applies particularly to extruders which have at least two screws, and more generally to extrusion machines in which mixing, kneading, comminuting, reaction, drawing-out, baking and in particular shearing effects are introduced by passing through the barrel a substance that is carried along by the rotation of the screws.

BACKGROUND OF THE INVENTION

In general, an extrusion machine comprises a barrel of elongate shape equipped with a bore extending along the entire length of the said barrel and in which there is a liner that envelops the screws.

When the extrusion machine comprises two parallel-axis screws, the liner comprises two parallel-axis cylindrical bores in which the screws are placed, and these screws may or may not intermesh.

The screws are fitted on their periphery with, in particular, helically-wound flights which carry in a downstream direction the substance which is introduced via an upstream end of the barrel.

The substance is thus carried along as far as the downstream end of the barrel, which may be fitted with an extrusion die or alternatively simply have an outlet orifice if the substance is not to be subjected to an extrusion operation.

In order to vary the treatment to be carried out as the substance progresses along the barrel, the screws generally consist of successive regions which have flights of different shape or pitch or which comprise specific treatment members.

Until now, the bore in the barrel was obtained by making two secant drillings which form two longitudinal ribs where they intersect and by machining these longitudinal ribs to obtain a flat surface between the two drillings so as to produce a bore formed of two half lobes joined by flat portions.

This technique therefore requires a number of machining tools, particularly a boring machine for the drillings and a milling machine to produce the flat surfaces.

Furthermore, it is necessary when performing the stage of grinding the bore of the barrel, to use special-purpose tools of special shape, given that this bore is formed of a series of curved portions and flat portions.

These various operations and the change of tooling for each of these operations significantly increases the cost of the barrel and the time taken to machine the bore in the barrel.

SUMMARY OF THE INVENTION

The object of the invention is to overcome these drawbacks by providing an extrusion machine barrel which is easier to machine and allows a reduction in manufacturing lead time.

The subject of the invention is a barrel of an extrusion machine comprising a bore having three lubes and begin intended to take a liner in which at least two parallel-axis screws are rotated.

According to other features of the invention:

the lobes of the bore are formed by three secant drillings, the axes of which are mutually parallel and lie in the same plane as the main axis of the barrel, the axis of one of the drillings lying on the main axis and the axes of the other two drillings being located on either side of and equidistant from this main axis, the first drilling is made on the main axis of the barrel and the second and third drillings are made one on each side of and secant with the first drilling, the diameters of these drillings being roughly equal, the first drilling is made on one side of and at a given distance from the main axis of the barrel the second drilling is made on the other side of the main axis and the same distance away from the main axis of the barrel and the third drilling is made on this main axis, the drillings being secant and the diameters of the drillings being roughly equal, the axes of the drillings arranged on either side of the drilling that lies on the main axis of the barrel lie inside the circumference delimited by the drilling that is arranged on the main axis, the axes of the drillings that are arranged on either side of the drilling that lies on the main axis of the barrel lie on the circumference delimited by the drilling that is arranged on the main axis, the axes of the drillings arranged on either side of the drilling that is arranged on the main axis of the barrel lie outside the circumference delimited by the drilling that is arranged on the main axis, the drillings are made by a boring machine or a drilling machine.

Another subject of the invention is an extrusion machine barrel liner in which at least two parallel-axis screws are rotated, the outer face of the liner being formed by three lobes and comprising two parallel-axis secant bores.

BRIEF DESCRIPTION OF THE DRAWINGS

Other features and advantages of the invention will become clear through the description which will follow, given with reference to the appended drawings, in which.

DESCRIPTION OF PREFERRED EMBODIMENT

Figure 1:
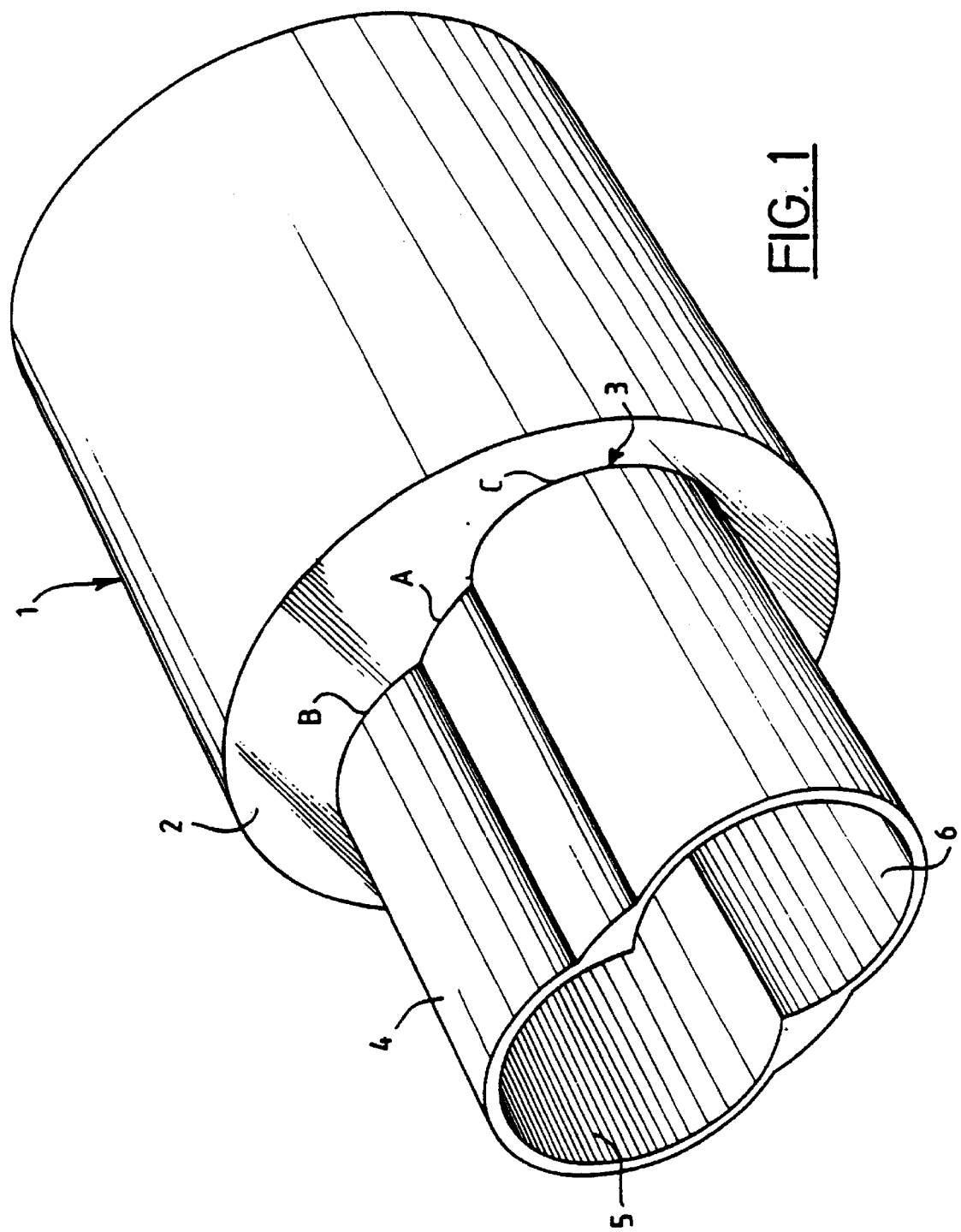
FIG. 1 is a schematic perspective view of a section in accordance with the invention.

FIG. 1 schematically shows a section of a barrel 1 of a parallel-axis twin-screw extrusion machine in which mixing, kneading, comminuting, reaction, drawing-out, baking and in particular shearing effects are produced by passing through this barrel 1 a substance that is carried along by the rotation of the screws.

The barrel 1 is of elongate shape and of any desired external cross section, for example of circular, oval, square or rectangular external cross section.

This barrel 1 is made up of a solid body 2 comprising a bore 3 extending along the entire length of the barrel 1 and intended to take a liner 4 which has two parallel-axis secant bores 5 and 6 in which two screws not shown, are placed.

In the conventional way, the screws consist of successive regions which have flights of different shape or pitch or which comprise specific treatment members.

These screws carry along in the downstream direction the substance which is introduced via an upstream end of the barrel 1.

As depicted in FIG. 1, the bore 3 formed in the barrel 1 is made up of three lobes, A, B, C, respectively.

The liner 4 has an external profile that corresponds to the profile of the bore 3.

Thus, the liner 4 has an external face that is formed of three lobes.

In general, the method of machining the bore 3 in the barrel 1 consists in making, in succession, three secant drillings, the axes of which are mutually parallel and lie in the same plane as the main axis of the barrel 1, the axis of one of the drillings lying on the main axis and the axes of the other two drillings lying one on each side of and equidistant from this main axis, and in performing an operation of grinding these drillings.

A first method of machining the bore 3 in the barrel will now be described with reference to FIGS. 2 to 4.

Figure 2:
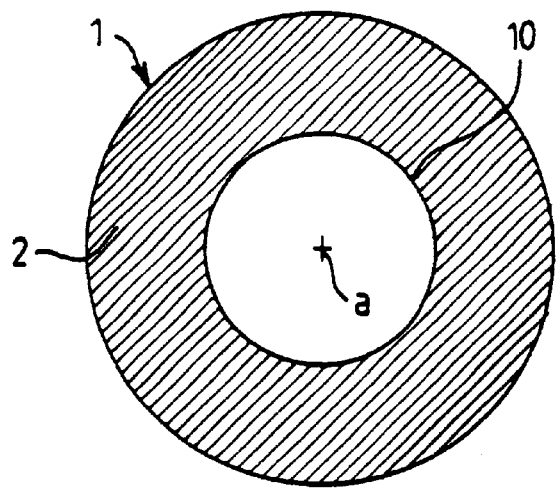
FIGS. 2 to 4 are views in cross section showing various stages of a first method of machining the bore inside the barrel.

First of all, as depicted in FIG. 2, a first drilling 10, the axis a of which lies on the main axis of the barrel 1 is made.

Figure 3:
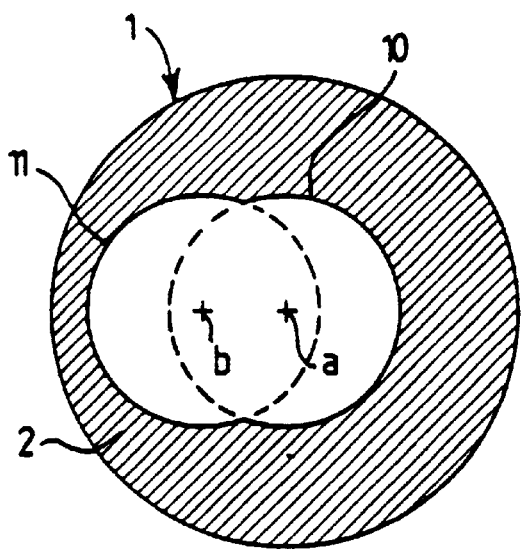

Next, and as depicted in FIG. 3, a second drilling 11 secant with the first drilling 10 and of a diameter roughly equal to the diameter of this first drilling 10 is made on one side of the first drilling 10.

The axis b of the second drilling 11 is parallel to the axis a of the first drilling 10.

Figure 4:
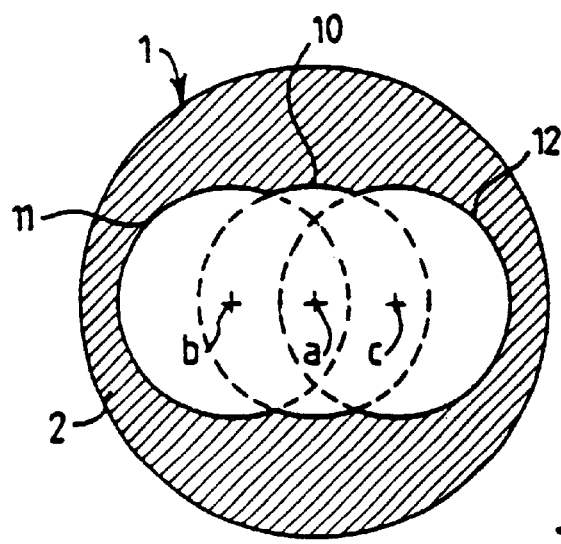

Finally, and as depicted in FIG. 4, a third drilling 12 secant with the first drilling 10 and of a diameter roughly equal to the diameters of the first drilling 10 and of the second drilling 11 is made on the other side of the first drilling 10 with respect to the second drilling 11.

The axis c of the third drilling 12 is parallel to the axes a and b of the first drilling 10 and of the second drilling 11, respectively.

The axes a, b and c of the drillings 10, 11 and 12 lie in the same plane.

Furthermore, the axes b and c of the second 11 and of the third 12 drillings respectively, are equidistant from the axis a of the first drilling 10.

According to a first embodiment depicted in FIG. 4, the axes b and c of the second drilling 11 and of the third drilling 12, respectively, lie inside the circumference delimited by the first drilling 10.

According to two other embodiments, the axes b and c of the second drilling 11 and of the third drilling 12, respectively, may lie on or outside the circumference delimited by the first drilling 10.

A second method of machining the bore 3 in the barrel 1 will be described with reference to FIGS. 5 to 7.

Figure 5:
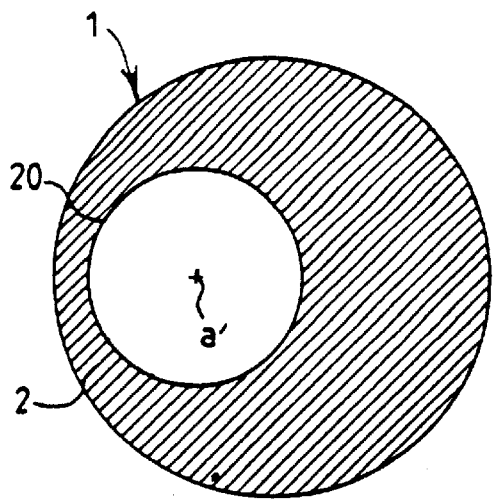
FIGS. 5 to 7 are views in cross section showing the various stages of a second method of machining the bore inside the barrel.

In this case, and as depicted in FIG. 5, a first drilling 20 is made on one side of and at a given distance from the main axis of the barrel 1.

The axis a' of this first drilling 20 is parallel to the main axis of the barrel 1.

Figure 6:
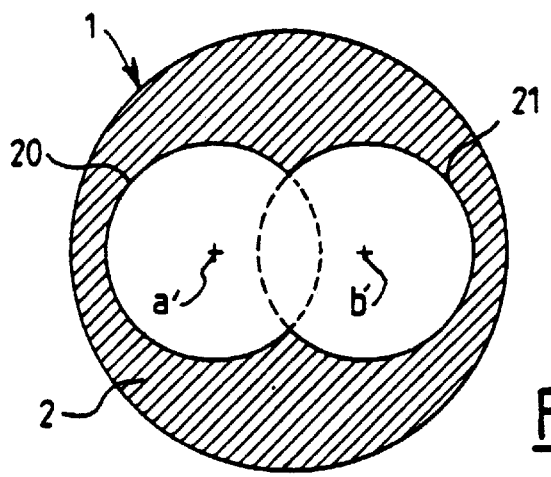

Next, and as depicted in FIG. 6, a second drilling 21 is made on the other side of and the same distance away from the main axis of the barrel 1 with respect to the first drilling 20.

The second drilling 21 is secant with the first drilling 20 and the axis b' of this second drilling 21 is parallel to the axis a' of the first drilling 20 and to the main axis of the barrel 1.

Figure 7:
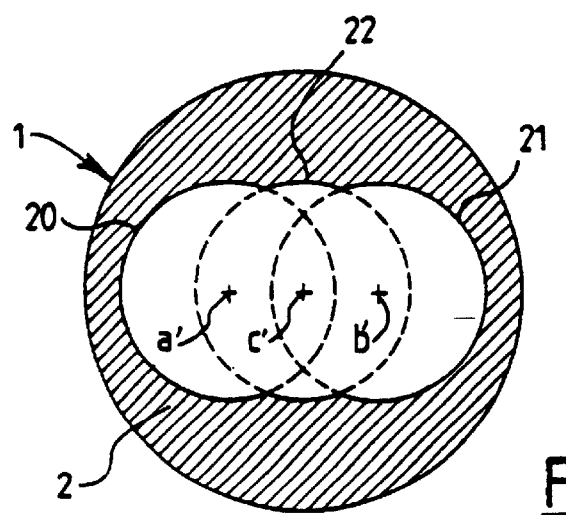

Finally, and as depicted in FIG. 7, a third drilling 22 is made on the main axis of the barrel 1, the axis c' of this third drilling 22 being parallel to the axes a' and b' of the first drilling 20 and of the second drilling 21, respectively.

The axes a', b' and c' of the drillings 20, 21 and 22 lie in the same plane and the diameters of the said drillings 20, 21 and 22 are roughly equal.

According to a first embodiment depicted in FIG. 7, the axes a' and b' of the first drilling 20 and of the second drilling 21, respectively, lie inside the circumference delimited by the third drilling 22.

According to two other alternative forms, the axes a' and b' of the first drilling 20 and of the second drilling 21, respectively, may lie on the circumference delimited by the third drilling 22 or outside this circumference.

The drillings 10, 11, 12 and 20, 21, 22 are made solely by means of one tool, for example of the boring machine or drilling machine type, commonly used in the field of machining.

These drillings 10, 11, 12 and 20, 21, 22 form the three lobes A, B and C of the bore 3 of the barrel 1.

Once the drillings 10, 11 and 12 or 20, 21 and 22 have been completed, a grinding stage is performed using a tool of a conventional shape commonly employed in the grinding of a cylindrical bore.

The external profile of the liner 4 is produced, for example, using a grinding machine commonly used in the field of machining.

With such a barrel, the number of operations needed to produce the bore is reduced, as thus is the machining time, and this machining employs only tools which are commonly used, thus making it possible to reduce the cost of manufacturing the barrel.

What is claimed is:

1. An extrusion machine comprising a barrel (1) having a bore (3) formed of three lobes and a liner (4) having an external face that is formed of three lobes and having two parallel-axis secant bores (5, 6) in which two screws are located.

2. The extrusion maching according to claim 1, wherein the lobes of the bore (3) are formed by three secant drillings (10, 11, 12; 20, 21, 22), the axes of which are mutually parallel and lie in a same plane as a main axis of the barrel (1), the axis of a first (10; 22) of said drillings lying on said main axis and the axes of second and third of said drillings (11, 12; 20, 21) lying one on each side of and equidistant from said main axis.

3. The extrusion machine according to claim 2, wherein said first drilling (10) is made on the main axis of the barrel (1) and said second drilling (11) and said third drilling (12) are made one on each side of said first drilling (10) and secant with said first drilling (10), the diameters of all three of said drillings (10, 11, 12) being substantially equal.

4. The extrusion machine according to claim 2, wherein said first drilling (20) is made on one side of and at a given distance from the main axis of the barrel (1) and said second drilling (21) is made on the other side of said main axis and the same distance away from the main axis of said barrel (1) and said third drilling (22) is made on said main axis, said drillings (20, 21, 22) being secant and the diameters of these drillings (20, 21, 22) being substantially equal.

5. The extrusion machine according to claim 2, wherein the axes of the drillings (11, 12; 20, 21) arranged one on each side of the drilling (10; 22) that lies on the main axis of the barrel (1) lie inside the circumference delimited by the drilling (10; 22) that is arranged on said main axis.

6. The extrusion machine according to claim 2, wherein the drillings (10, 11, 12; 20, 21, 22) are made using a boring machine.

7. The extrusion machine according to claim 2, wherein the drillings (10, 11, 12; 20, 21, 22) are made using a drilling machine.

* * * * *